US009884646B2

United States Patent
Tomozawa et al.

(10) Patent No.: US 9,884,646 B2
(45) Date of Patent: Feb. 6, 2018

(54) PARKING ASSIST SYSTEM AND PATH DETERMINATION METHOD

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Motokatsu Tomozawa, Nagoya (JP); Motonari Obayashi, Nagakute (JP); Hironobu Ishijima, Toyota (JP)

(73) Assignees: AISIN SEIKI KABUSHIKI KAISHA, Karita-shi, Aichi-ken (JP); TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 222 days.

(21) Appl. No.: 14/850,369

(22) Filed: Sep. 10, 2015

(65) Prior Publication Data
US 2016/0075329 A1 Mar. 17, 2016

(30) Foreign Application Priority Data
Sep. 12, 2014 (JP) .................................. 2014-186779

(51) Int. Cl.
*B60W 30/06* (2006.01)
*B60W 10/20* (2006.01)
(Continued)

(52) U.S. Cl.
CPC ......... *B62D 15/0285* (2013.01); *B60W 10/20* (2013.01); *B60W 30/06* (2013.01)

(58) Field of Classification Search
CPC ...... B60W 10/04; B60W 10/10; B60W 10/20; B60W 30/06; B60W 2540/04; B60W 2550/10; G08G 1/168
See application file for complete search history.

(56) References Cited

U.S. PATENT DOCUMENTS

| 6,611,744 B1* | 8/2003 | Shimazaki | ................ B60R 1/00 180/168 |
| 2002/0084916 A1* | 7/2002 | Shimizu | ................ B60Q 9/005 340/932.2 |

(Continued)

FOREIGN PATENT DOCUMENTS

| JP | 2005-35498 A | 2/2005 |
| JP | 2009-502646 A | 1/2009 |

(Continued)

OTHER PUBLICATIONS

Communication dated Aug. 2, 2016 from the Japanese Patent Office in counterpart Application No. 2014-186779.

*Primary Examiner* — Thomas G Black
*Assistant Examiner* — Ce Li
(74) *Attorney, Agent, or Firm* — Sughrue Mion, PLLC

(57) ABSTRACT

A parking assist system includes an electronic control unit. The electronic control unit is configured to: at the time of assisting in parking a vehicle to a parking area, determine a path from an initial position of the vehicle to a target position; generate a first circumference that passes through the initial position and that touches a traveling direction of the vehicle, as the path; determine a center position on the basis of a position of a rear corner of a parked vehicle ahead, a turning radius of the vehicle at a minimum turn and the target position; and generate a second circumference that has a center at the center position and that passes through the target position and touches both the traveling direction of the vehicle at the target position and the first circumference, as the path continuous with the first circumference.

18 Claims, 14 Drawing Sheets

(51) Int. Cl.
*B60W 10/10* (2012.01)
*B62D 15/02* (2006.01)

(56) References Cited

U.S. PATENT DOCUMENTS

| | | | |
|---|---|---|---|
| 2010/0204866 A1* | 8/2010 | Moshchuk | B62D 15/0285 701/25 |
| 2014/0057237 A1* | 2/2014 | Chen | B62D 15/028 434/305 |
| 2014/0058656 A1* | 2/2014 | Chen | B62D 15/0285 701/400 |
| 2014/0160287 A1* | 6/2014 | Chen | G08G 1/168 348/148 |

FOREIGN PATENT DOCUMENTS

| | | |
|---|---|---|
| JP | 2014-034230 A | 2/2014 |
| WO | 2007/015020 A2 | 2/2007 |

* cited by examiner

F I G . 10
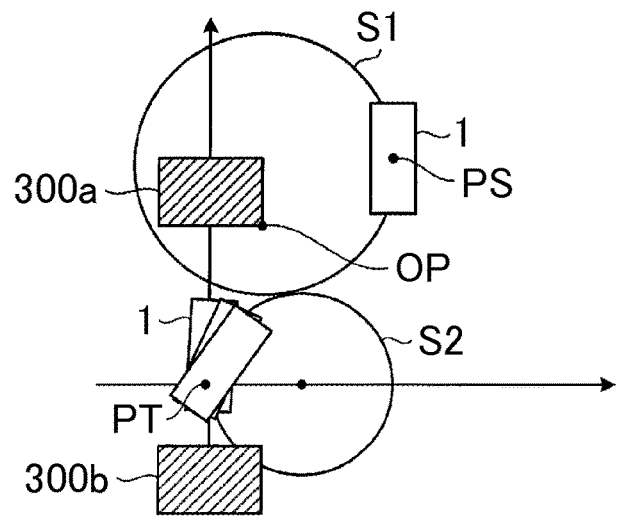
F I G . 11
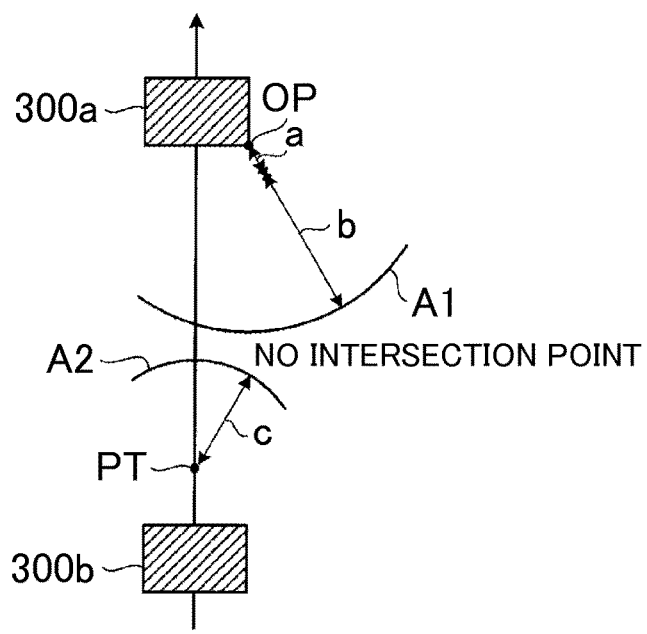

PARKING ASSIST SYSTEM AND PATH DETERMINATION METHOD

INCORPORATION BY REFERENCE

The disclosure of Japanese Patent Application No. 2014-186779 filed on Sep. 12, 2014 including the specification, drawings and abstract is incorporated herein by reference in its entirety.

BACKGROUND OF THE INVENTION

1. Field of the Invention

The invention relates to a parking assist system and a path determination method.

2. Description of Related Art

In a technique for assisting in parking a vehicle, parking assist is performed such that a path from an initial position of the vehicle to a parking target position within a parking area is determined and then the vehicle is moved to the parking target position along the path. In such a parking assist system, a first circle that passes through the initial position and tangentially touches a traveling direction of the vehicle is generated, a second circle that passes through the target position and touches both the traveling direction of the vehicle at the target position and the first circle is generated, and the path is determined so as to run from the circumference of the first circle to the circumference of the second circle.

SUMMARY OF THE INVENTION

In such a parking assist system, in the case where the space of an available parking area is small, when it is determined whether the vehicle is allowed to be parked when parked at an angle at the parking target position or when the angle of the vehicle is calculated when the vehicle is allowed to be parked, computation is performed while changing the angle of the vehicle at the parking target position little by little by generating a plurality of second circles having different radii, so the amount of computation at the time of determining a path is enormous.

Therefore, it is desired to reduce the amount of computation at the time of determining a path.

A first aspect of the invention provides a parking assist system. The parking assist system includes an electronic control unit. The electronic control unit is configured to, at the time of assisting in parking a vehicle to a parking area, determine a path from an initial position of the vehicle to a target position. The electronic control unit is configured to generate a first circumference that passes through the initial position and that touches a traveling direction of the vehicle, as the path. The electronic control unit is configured to determine a center position on the basis of a position of a rear corner of a parked vehicle ahead, a turning radius of the vehicle at a minimum turn and the target position. The electronic control unit is configured to generate a second circumference that has a center at the center position and that passes through the target position and touches both the traveling direction of the vehicle at the target position and the first circumference, as the path continuous with the first circumference.

A second aspect of the invention provides a path determination method for, at the time of assisting in parking a vehicle to a parking area, determining a path from an initial position of the vehicle to a target position. The path determination method includes: generating a first circumference that passes through the initial position and that touches a traveling direction of the vehicle, as the path; determining a center position on the basis of a position of a rear corner of a parked vehicle ahead, a turning radius of the vehicle at a minimum turn and the target position; and generating a second circumference that has a center at the center position and that passes through the target position and touches both the traveling direction of the vehicle at the target position and the first circumference, as the path continuous with the first circumference.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

FIG. 10 is a view that illustrates the outline of path determination according to the embodiment;

FIG. 11 is a view that shows an example of a process of generating a second circle in path determination according to the embodiment;

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may obtain at least one of various advantageous effects based on a basic configuration or secondary advantageous effects.

A vehicle 1 according to the present embodiment may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
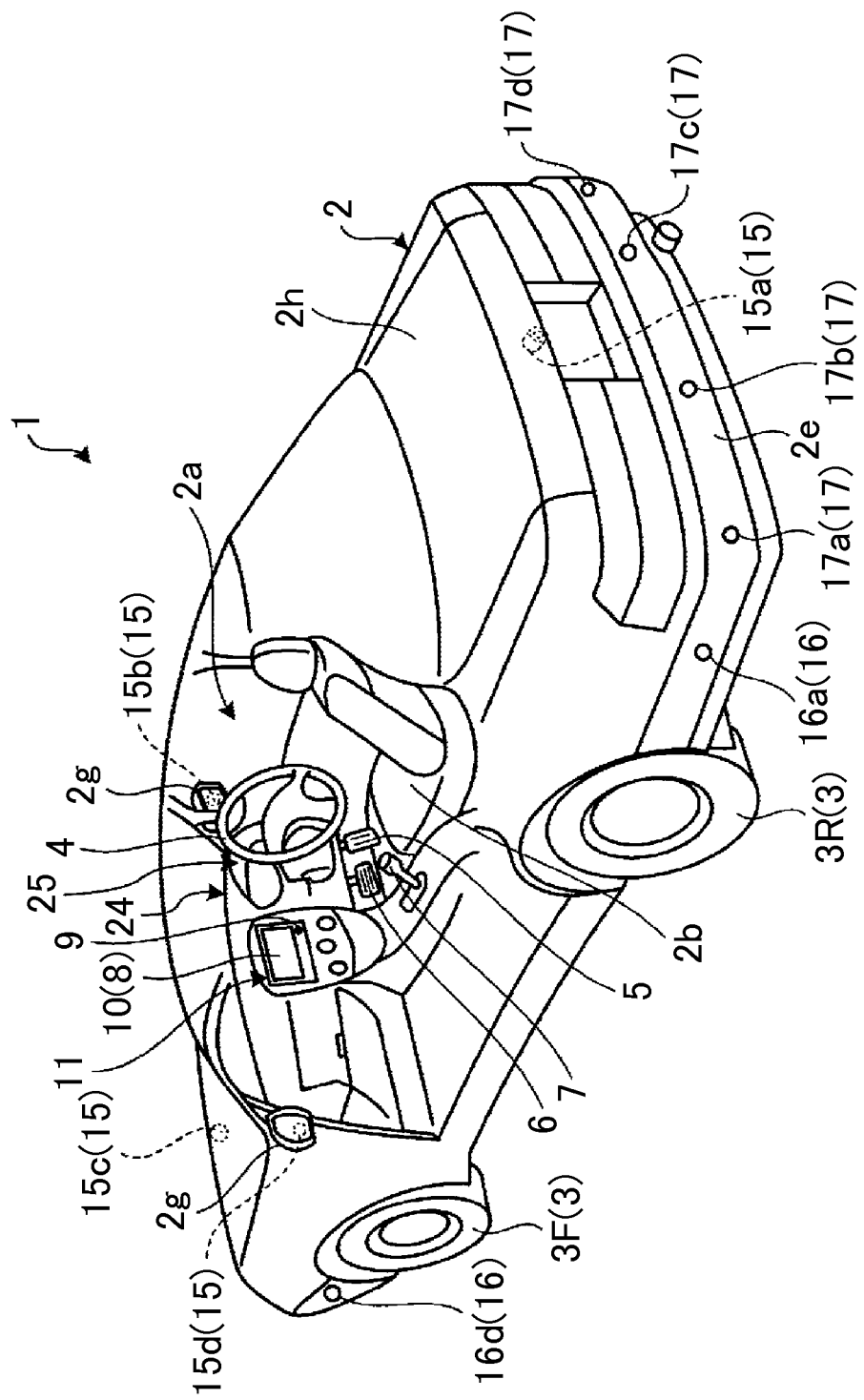
Figure 2:
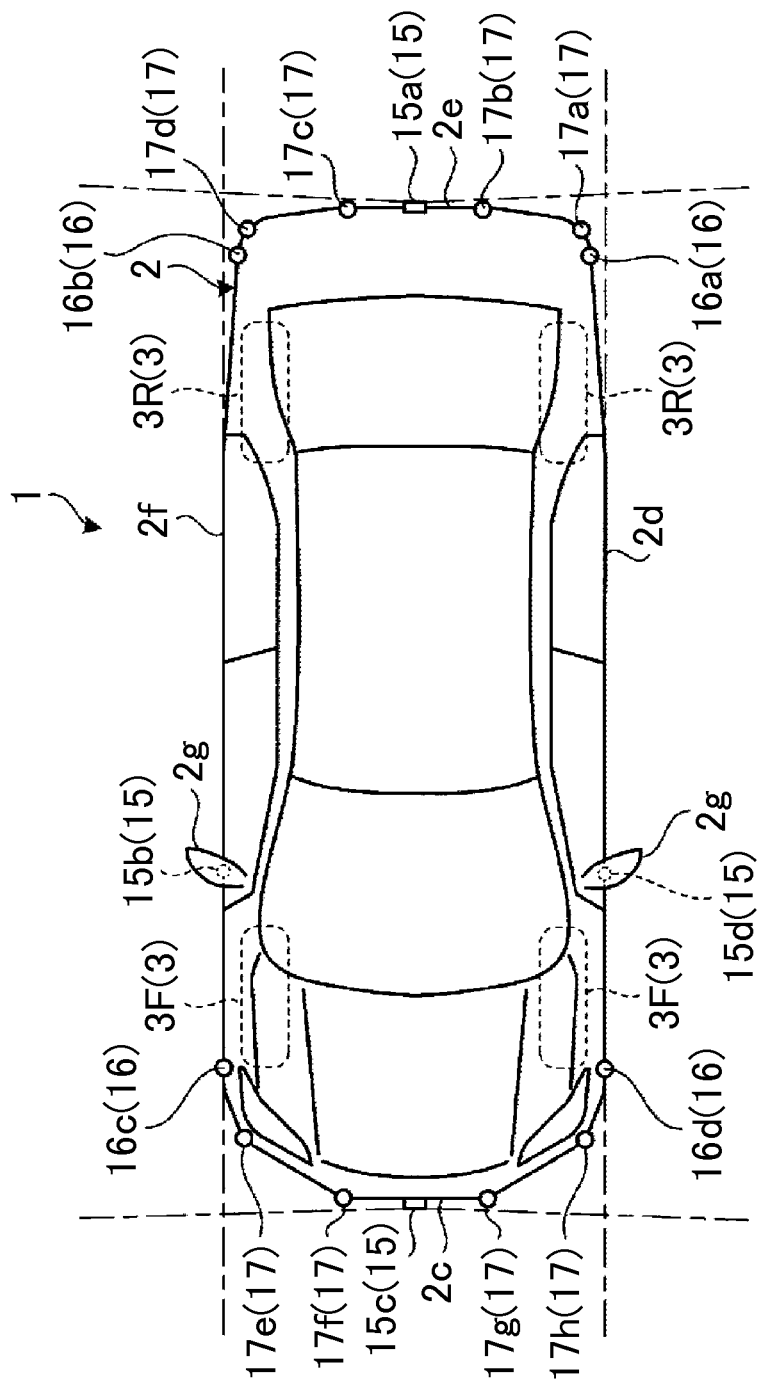
FIG. 2 is an exemplary plan view (bird's-eye view) of the vehicle according to the embodiment.

FIG. 1 is an exemplary perspective view of a vehicle according to the embodiment in a state where part of a cabin is seen through. FIG. 2 is an exemplary plan view (bird's-eye view) of the vehicle according to the embodiment. As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an input operation by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2a, different from the monitor device 11. Audio may be output from the audio output device 9 of the monitor device 11 and another audio output device. The monitor device 11 is, for example, shared with a navigation system or an audio system. A display device 12 different from the display device 8 is provided inside the cabin 2a.

Figure 3:
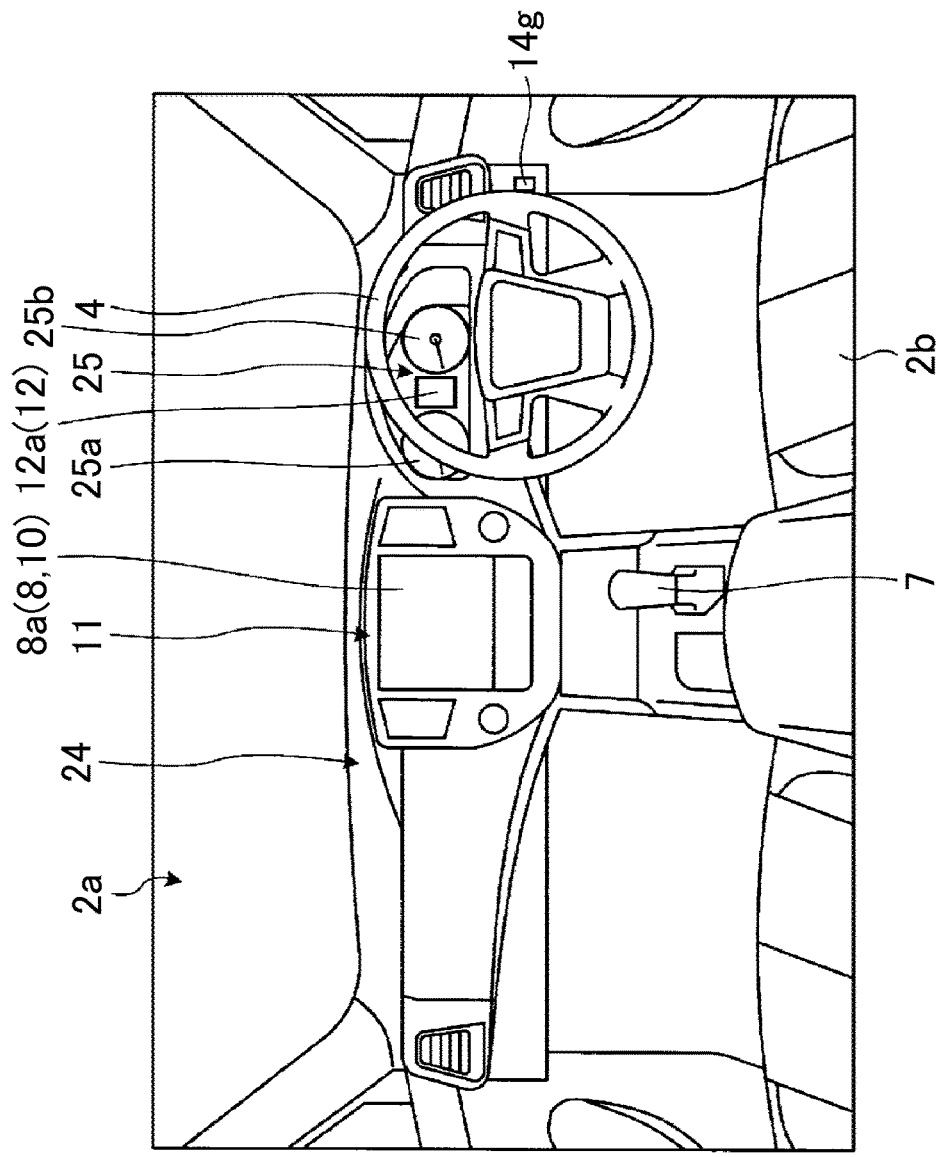
FIG. 3 is a view of an example of a dashboard of the vehicle according to the embodiment when viewed from the rear side of the vehicle.

FIG. 3 is a view of an example of a dashboard of the vehicle according to the embodiment when viewed from the rear side of the vehicle. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable.

Figure 4:
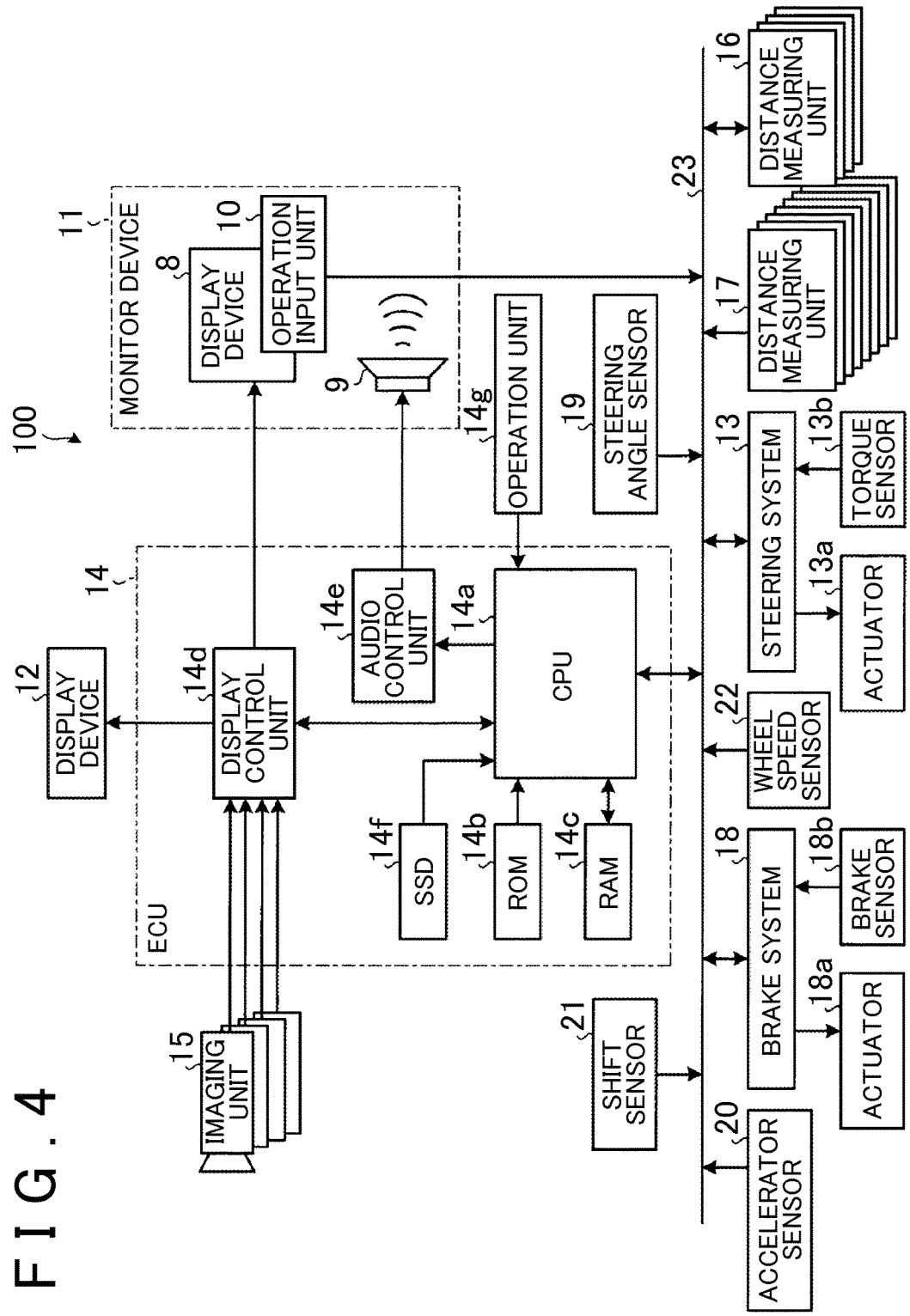
FIG. 4 is an exemplary block diagram of the configuration of a parking assist system according to the embodiment.

FIG. 4 is an exemplary block diagram of the configuration of a parking assist system according to the embodiment. As illustrated in FIG. 4, the vehicle 1 includes a steering system that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move and an outside environment around the vehicle body 2, including an area in which the vehicle 1 is allowed to be parked, and outputs the captured image as captured image data.

The imaging unit 15a is, for example, located at a rear end 2e of the vehicle body 2, and is provided at a lower wall portion of a door 2h of a rear boot. The imaging unit 15b is, for example, located at a right-side end 2f of the vehicle body 2, and is provided at a right-side door mirror 2g. The imaging unit 15c is, for example, located at the front of the vehicle body 2, that is, a front end 2c in the vehicle longitudinal direction, and is provided at a front bumper, or the like. The imaging unit 15d is, for example, located at the left side of the vehicle body 2, that is, a left-side end 2d in the vehicle width direction, and is provided at a door mirror 2g that serves as a left-side projecting portion. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and control, such as image processing related to images that are displayed on the display devices 8, 12, determination of a moving target position of the vehicle 1, computation of a moving path of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and, by extension, the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is, for example, a sensor that detects the position of the brake pedal that serves as a movable unit of the brake operation unit 6. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit of the shift operation unit 7. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed, as a sensor value. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
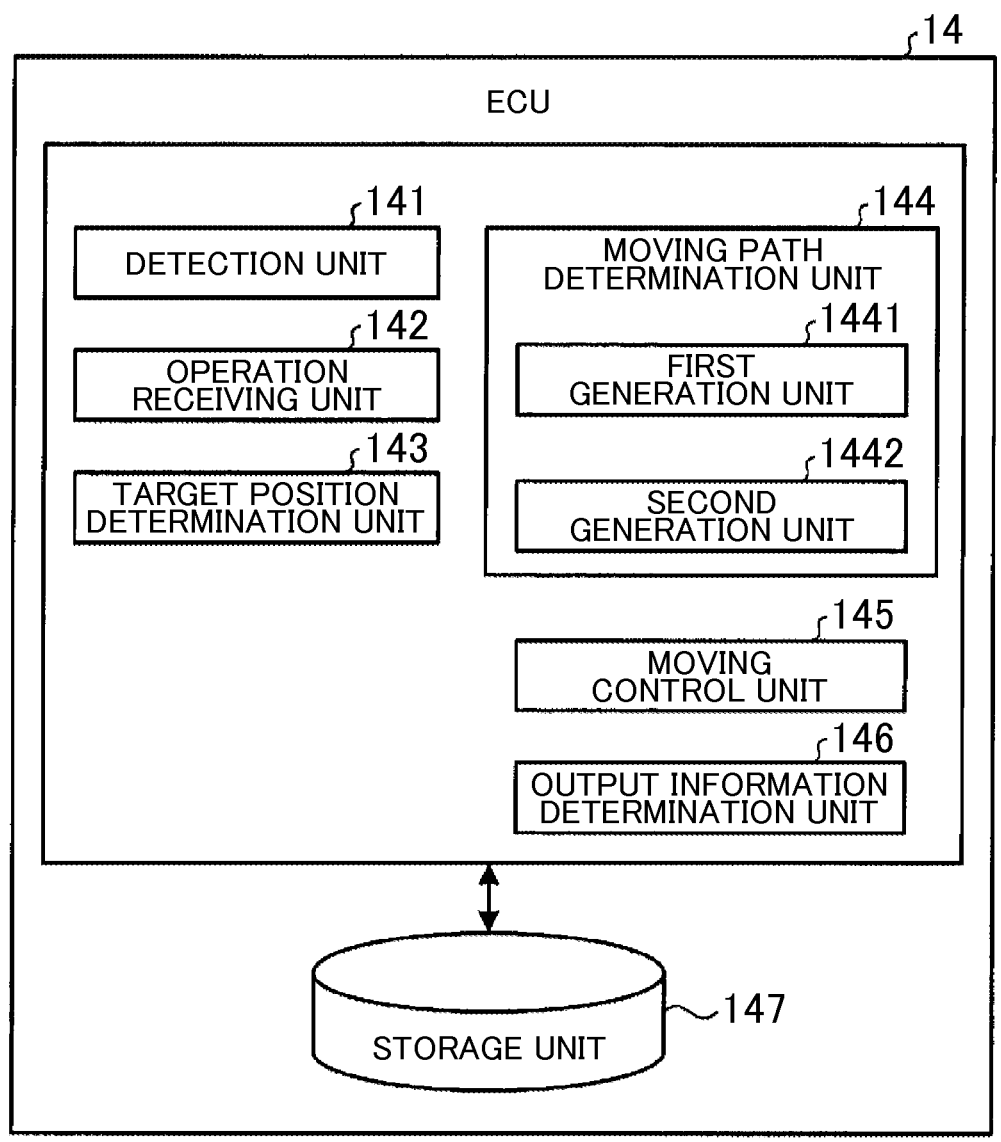
FIG. 5 is an exemplary block diagram of the configuration of an ECU of the parking assist system according to the embodiment.

In the present embodiment, the ECU 14 implements at least part of the function of a parking assist system by cooperation between hardware and software (control program). FIG. 5 is a functional configuration block diagram of the ECU. As shown in FIG. 5, the ECU 14 functions as a detection unit 141, an operation receiving unit 142, a target position determination unit 143, a moving path determination unit 144, a moving control unit 145, an output information determination unit 146 and a storage unit 147.

In the above configuration, the detection unit 141 detects an obstacle, such as another vehicle and a pole, a frame line, such as a parking space line, and the like. The operation receiving unit 142 acquires an operation signal that is input through operation of an operation unit 14g. The operation unit 14g is, for example, formed of a push button, a switch, or the like, and outputs an operation signal. The target position determination unit 143 determines a moving target position (parking target position) of the vehicle 1.

The moving path determination unit 144 determines a moving path of the vehicle 1 to the moving target position. In the present embodiment, the moving path determination unit 144 determines a moving path by generating two circles. As shown in FIG. 5, the moving path determination unit 144 includes a first generation unit 1441 and a second generation unit 1442.

The first generation unit 1441 generates a circumference (first circumference) of a first circle as a moving path. The first circle passes through an initial position of the vehicle 1 and touches a traveling direction of the vehicle 1. The second generation unit 1442 determines a center position on the basis of a position of a corner (rear corner) of a vehicle 1-side rear of a parked vehicle ahead, a turning radius of the vehicle 1 at a minimum turn and a parking target position. The second generation unit 1442 generates a second circle that has a center at the center position and that passes through the parking target position and touches both the traveling direction of the vehicle 1 at the parking target position and the circumference (first circumference) of the first circle. The second generation unit 1442 generates a circumference (second circumference) of the second circle as a moving path continuous with the circumference of the first circle.

The moving control unit 145 (control unit) controls the portions of the vehicle 1 such that the vehicle 1 moves to the moving target position (parking target position) along the moving path. The output information determination unit 146 determines information that is output through the display device 12, the display device 8, the audio output device 9, or the like, an output mode of the information, and the like.

The storage unit 147 stores data that are used in computation in the ECU 14 or data calculated in computation in the ECU 14.

Figure 6:
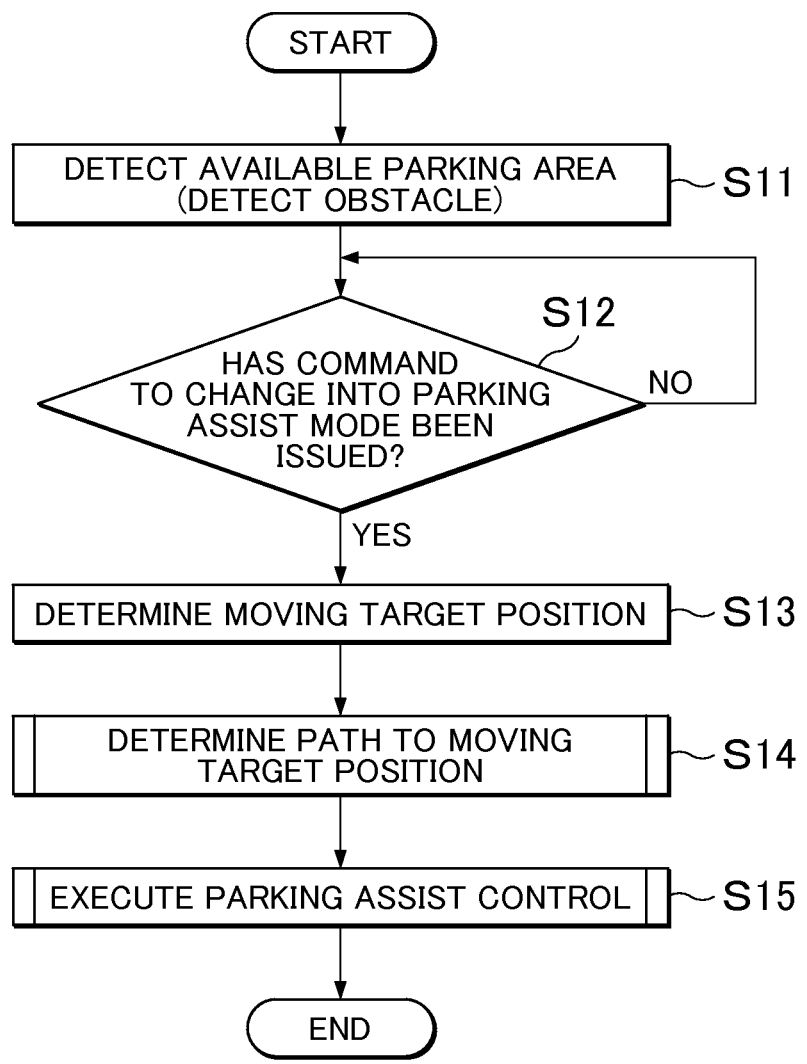
FIG. 6 is a flowchart that shows the procedure of a schematic process according to the embodiment.
Figure 7:
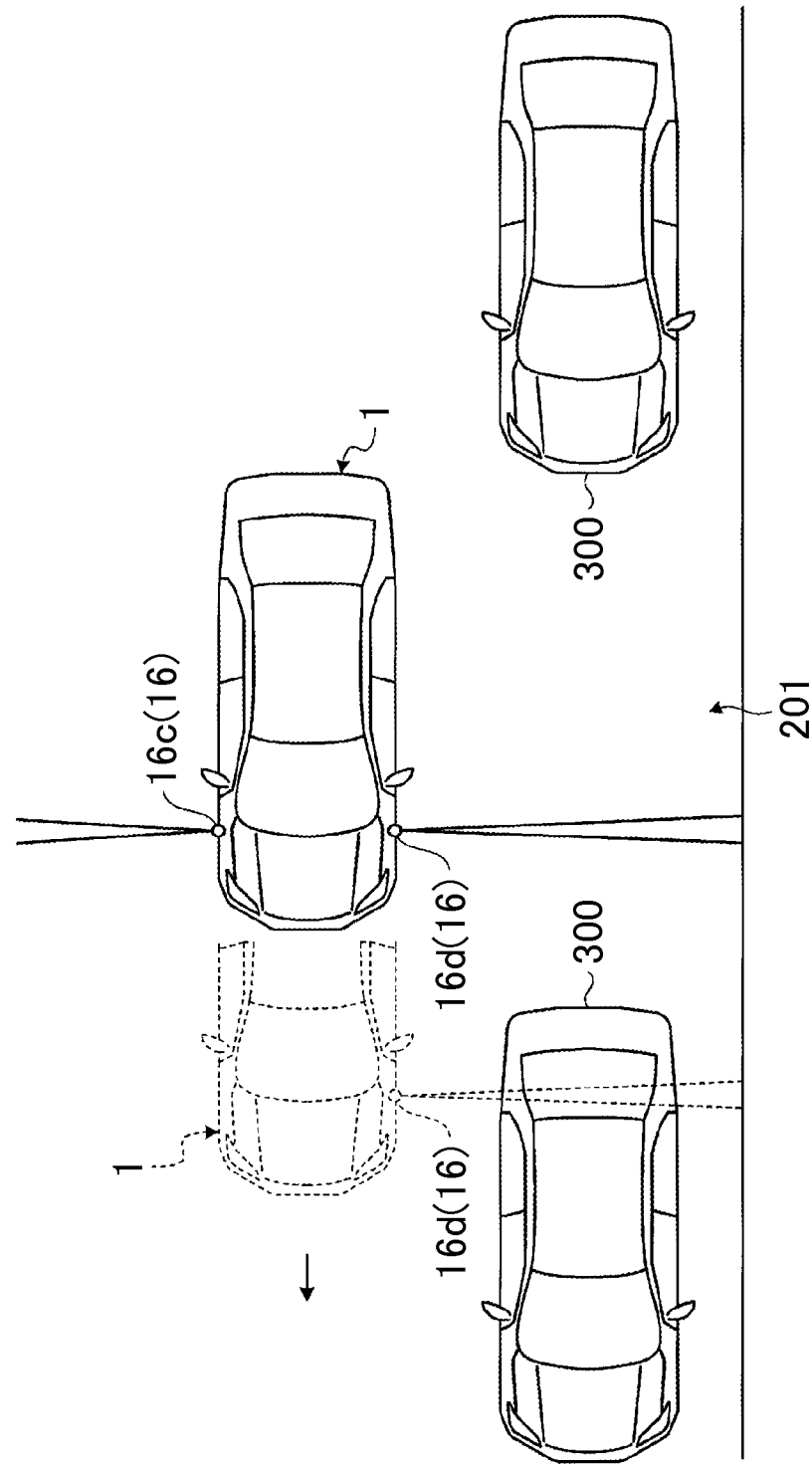
FIG. 7 is a view that illustrates detection of an available parking area according to the embodiment.

Next, the operation of the embodiment will be described. FIG. 6 is a flowchart of a schematic process according to the embodiment. Initially, the ECU 14 detects an available parking area (detects an obstacle) (step S11). FIG. 7 is a view that illustrates detection of an available parking area. Specifically, the distance measuring units 16c, 16d calculate a distance to an obstacle, such as another vehicle 300, at intervals of predetermined sampling timing, and outputs the distance as data corresponding to a reflected portion (a set of reflected points of a sonic wave, or the like) of the obstacle. The output data are, for example, stored in the RAM 14c at output intervals.

The ECU 14 functions as the detection unit 141, and detects an available parking area 201 located to a side of the vehicle 1 on the basis of the output data of the distance measuring unit 16d. More specifically, the detection unit 141 determines that there is the available parking area 201 when output data corresponding to an obstacle are output for a period longer than or equal to a period corresponding to a first predetermined duration and, after that, when output data corresponding to the case where there is no obstacle (including the case where a distance to an obstacle is longer than or equal to the vehicle longitudinal length required for the vehicle to park, that is, the overall length of the vehicle) are output for a period longer than or equal to a second predetermined duration corresponding to a minimum width required as an area in which the vehicle 1 is allowed to be parked.

The detection unit 141 is able to detect the available parking area 201 by applying edge extraction to captured data of a parking space line, or the like, such as a white line provided on a traveling surface, such as a ground surface and a road surface, on the basis of captured data output from the imaging unit 15d that captures an image on the left side of the vehicle 1.

Subsequently, the ECU 14 functions as the operation receiving unit 142, and determines whether a command to change into the parking assist mode has been issued via the operation unit 14g (step S12). When it is determined in step S12 that a command to change into the parking assist mode has not been issued via the operation unit 14g yet (No in step S12), the process enters in a standby state. When it is determined in step S12 that a command to change into the parking assist mode has been issued via the operation unit 14g (Yes in step S12), the ECU 14 functions as the target position determination unit 143, and determines a moving target position (parking target position) of the vehicle 1 (step S13). Subsequently, the ECU 14 functions as the moving path determination unit 144, and determines a moving path to the moving target position of the vehicle 1 (step S14).

Figure 8:
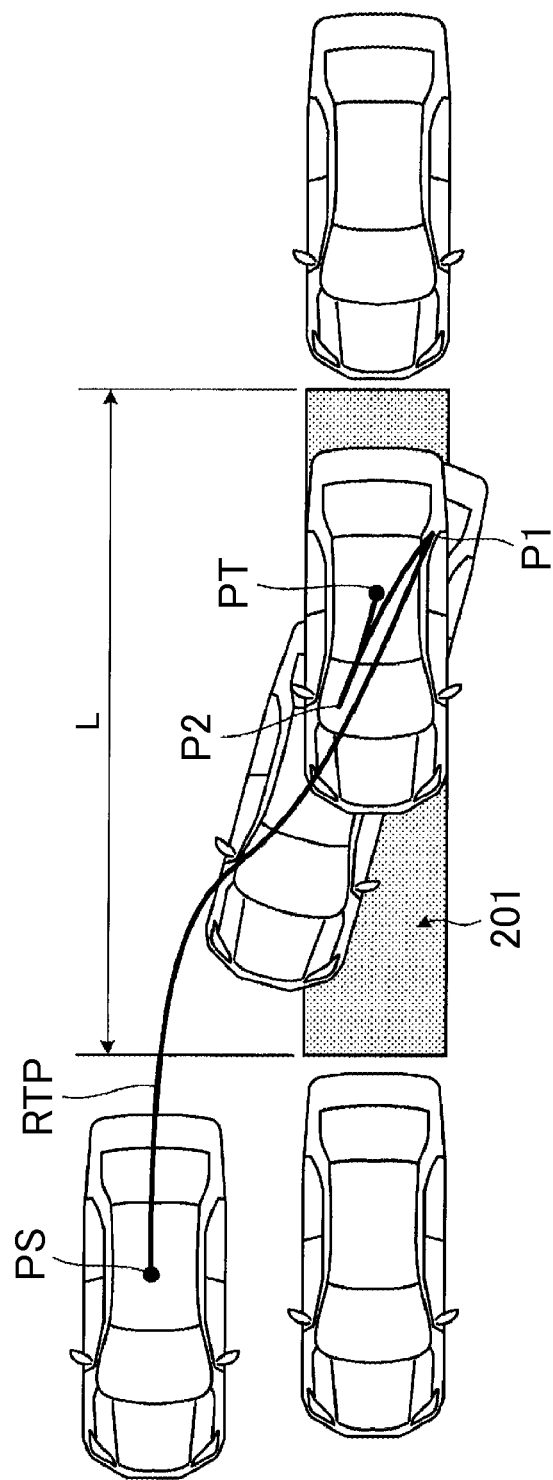
FIG. 8 is a view that illustrates an example of a set moving path according to the embodiment.

FIG. 8 is a view that illustrates an example of a set moving path. The case of the moving path in which switching positions of the vehicle at which the steering wheel that serves as the steering unit 4 is turned are two positions P1, P2 will be described with reference to FIG. 8.

The moving path RTP shown in FIG. 8 reverses from an initial position PS at the start of a parking assist control process for the vehicle 1 toward the switching position P1 by turning the steering wheel that serves as the steering unit 4 leftward by a predetermined amount. In the moving path RTP, a driver depresses the brake pedal that serves as the brake operation unit 6 at the switching position P1 to stop the vehicle 1, changes the gear into forward, and advances the vehicle 1 toward the switching position P2 while slightly turning the steering wheel that serves as the steering unit 4 rightward. In the moving path RTP, the driver depresses the brake pedal that serves as the brake operation unit 6 at the switching position P2 to stop the vehicle 1, changes the gear into reverse, and reverses the vehicle 1 toward the parking target position PT.

In FIG. 8, L denotes a parking space length of a frontage through which the vehicle 1 enters the available parking area 201. At the time when the detection unit 141 detects the available parking area 201, the parking space length L is calculated.

Figure 9:
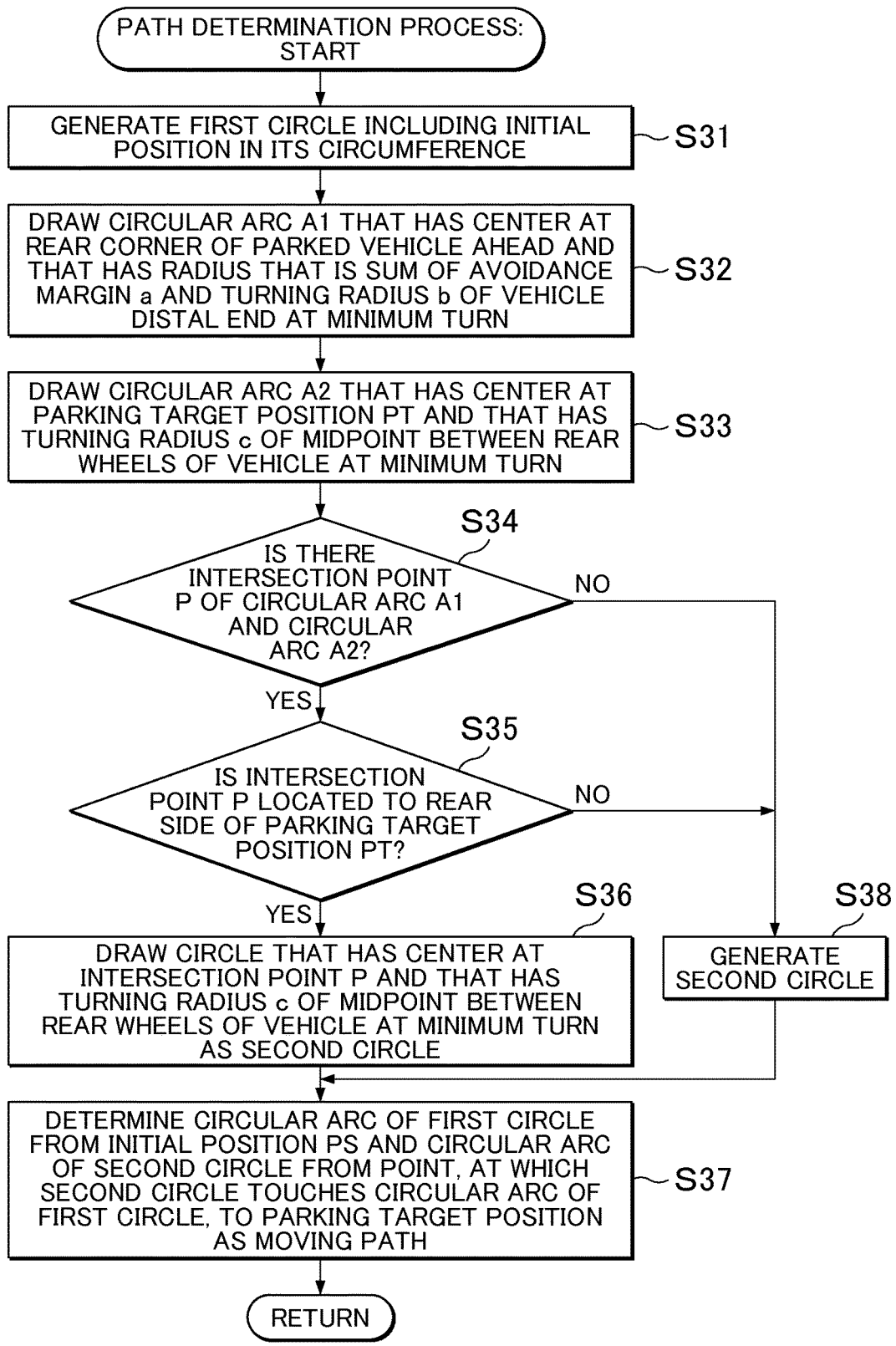
FIG. 9 is a flowchart that shows the procedure of a path determination process according to the embodiment.

In the present embodiment, the moving path RTP is further determined as follows. FIG. 9 is a flowchart that shows the procedure of a path determination process according to the present embodiment.

The ECU 14 functions as the first generation unit 1441 of the moving path determination unit 144, and generates a first circle S1 including the initial position PS of the vehicle 1 in its circumference (step S31).

FIG. 10 is a view that shows the outline of path determination according to the present embodiment. In FIG. 10, the sign 300*a* denotes a schematic parked vehicle ahead of the available parking area, and the sign 300*b* denotes a schematic parked vehicle behind the available parking area. In FIG. 10, the sign OP denotes the corner (rear corner) of an initial position PS-side rear of the parked vehicle 300*a* ahead.

In step S31, the first circle S1 shown in FIG. 10 is generated by a known technique described in Published Japanese Translation of PCT Application No. 2009-502646 (JP 2009-502646 A) or Japanese Patent Application Publication No. 2014-34230 (JP 2014-34230 A). That is, as shown in FIG. 10, the first generation unit 1441 generates the circumference (first circumference) of the first circle S1 that passes through the initial position PS of the vehicle 1 and that touches the traveling direction of the vehicle 1, and sets a moving path to the circumference (first circumference) that advances from the initial position PS in the traveling direction to a contact point with a second circle S2 (described later).

In the present embodiment, the ECU 14 further functions as the second generation unit 1442 of the moving path determination unit 144, and generates the second circle S2 shown in FIG. 10. The second generation unit 1442 determines a moving path continuous with the first circumference to a circumference (second circumference) of the second circle S2 from the contact point with the first circle S1 to the parking target position PT.

That is, in the present embodiment, the second generation unit 1442 determines a center position on the basis of the position of the rear corner OP of the parked vehicle 300*a* ahead, the turning radius of the vehicle 1 at the minimum turn and the parking target position PT, generates the second circle S2 that has a center at the center position and that passes through the parking target position PT and touches both the traveling direction of the vehicle 1 at the parking target position PT and the circumference (first circumference) of the first circle S1, and generates the circumference (second circumference) of the second circle S2 as the moving path continuous with the circumference of the first circle S1.

The minimum turn means that the vehicle 1 turns at the maximum steering angle. The minimum turning radius is a radius of a circular arc that is drawn by the vehicle 1 at a minimum turn of the vehicle 1. The moving path of the circumference of the second circle S2 is specifically determined by the second generation unit 1442 according to the present embodiment as follows.

The second generation unit 1442 generates (draws) a circular arc A1 that has a center at the initial position PS-side rear corner OP of the parked vehicle 300*a* ahead and that has a radius that is the sum of an avoidance margin a and a turning radius b of a distal end (front corner of the vehicle 1, opposite to the initial position PS side of the vehicle 1, at the minimum turn, in an imaginary available parking area (step S32).

The avoidance margin a (avoidance distance) is set by the driver in advance, and is a distance margin set in order to avoid a collision with the rear corner OP of the parked vehicle 300*a* ahead. The turning radius b (first radius) of the distal end of the vehicle 1, opposite to the initial position PS side of the vehicle 1, at the minimum turn of the vehicle 1 is a known value that is determined in advance from the maximum steering angle of the vehicle 1 and the longitudinal length (overall length) of the vehicle 1.

Subsequently, the second generation unit 1442 generates (draws) a circular arc A2 that has a center at the parking target position PT and that has a turning radius c of a midpoint between the rear wheels 3R of the vehicle 1 at the minimum turn of the vehicle 1, in the imaginary available parking area (step S33). The turning radius c (second radius) of the midpoint between the rear wheels 3R of the vehicle 1 at the minimum turn of the vehicle 1 is a known value that is determined in advance from the maximum steering angle of the vehicle 1 and the midpoint between the rear wheels 3R of the vehicle 1.

The second generation unit 1442 determines whether there is an intersection point of the circular arc A1 and the circular arc A2 (whether the circular arc A1 intersects with the circular arc A2) (step S34). FIG. 11 shows a state where the circular arc A1 and the circular arc A2 are generated and there is no intersection point.

When it is determined that there is no intersection point of the circular arc A1 and the circular arc A2 (No in step S34), because the space of the available parking area between the parked vehicle 300*a* ahead and the parked vehicle 300*b* behind is sufficiently large as shown in FIG. 11, the vehicle 1 is not parked at an angle at the parking target position PT. Therefore, the second generation unit 1442 does not generate a second circle according to the present embodiment but generates a second circle by the known technique described in JP 2009-502646 A or JP 2014-34230 A (step S38).

Figure 12:
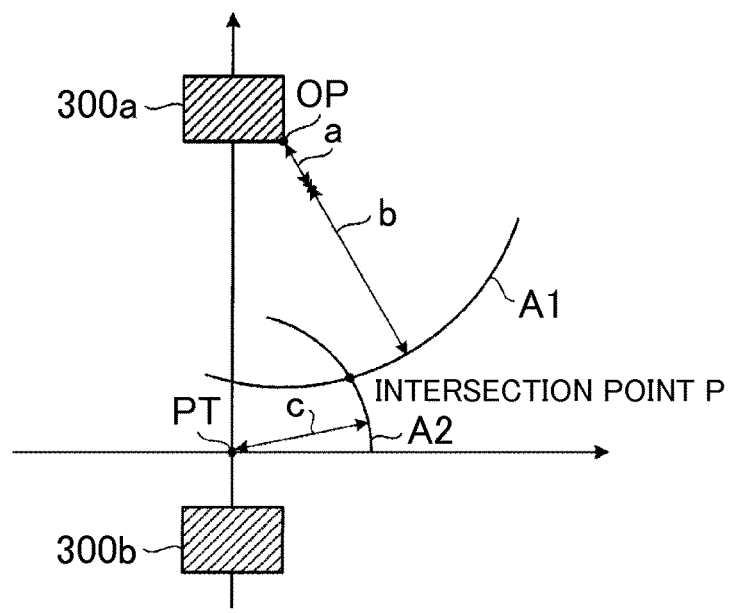
FIG. 12 is a view that shows an example of the process of generating a second circle in path determination according to the embodiment.
Figure 14:
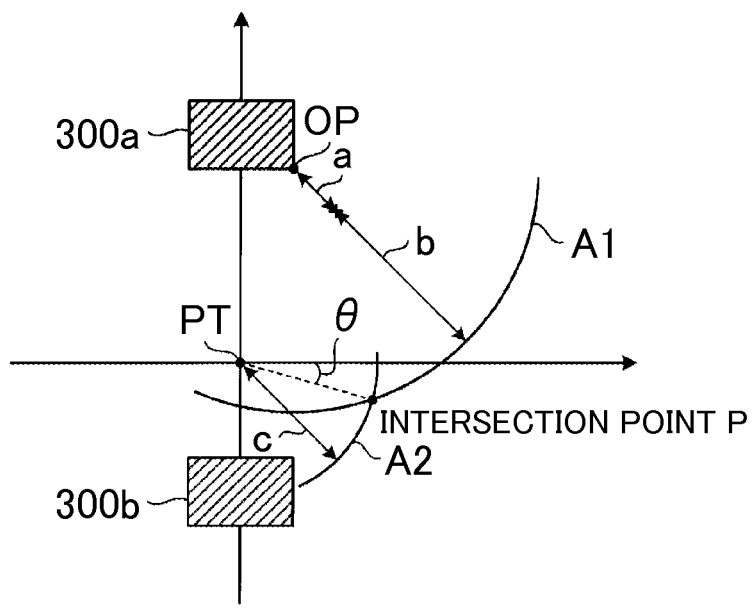
FIG. 14 is a view that shows an example of the process of generating a second circle in path determination according to the embodiment.

When it is determined in step S34 that there is an intersection point of the circular arc A1 and the circular arc A2 (Yes in step S34), the second generation unit 1442 determines whether the intersection point P is located to the rear side of the parking target position PT (on the parked vehicle 300*b* behind side) (step S35). FIG. 12 shows a state where the intersection point P of the circular arc A1 and the circular arc A2 is located to the front side of the parking target position PT (on the parked vehicle 300*a* ahead side). FIG. 14 shows a state where the intersection point P of the circular arc A1 and the circular arc A2 is located to the rear side of the parking target position PT (on the parked vehicle 300*b* behind side).

When the intersection point P is located to the forward side of the parking target position PT or located at the same level as the parking target position PT in FIG. 12 (No in step S35), because the space of the available parking area between the parked vehicle 300*a* ahead and the parked vehicle 300*b* behind is sufficiently large as shown in FIG. 12, the vehicle 1 is not parked at an angle at the parking target position PT. Therefore, the second generation unit 1442 does not generate a second circle according to the present embodiment but generates a second circle by the known technique described in JP 2009-502646 A or JP 2014-34230 A (step S38).

Figure 13:
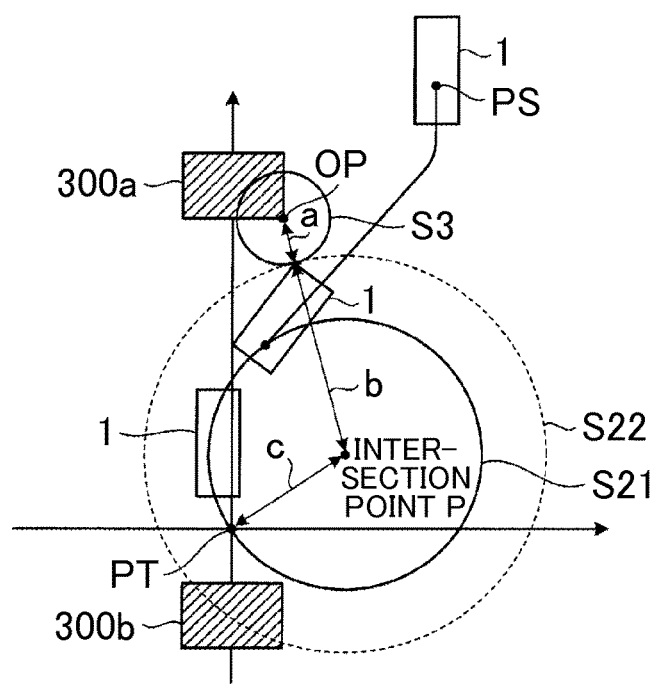
FIG. 13 is a view that shows an example of generating a second circle in path determination according to the embodiment.

When the intersection point P is located to the forward side of the parking target position PT or located at the same level as the parking target position PT in FIG. 12, a second circle S21 may be generated by the technique according to the present embodiment by the use of a method (described later). However, in this case, as shown in FIG. 13, a state where the vehicle 1 is not placed at an angle at the parking target position PT is overshot, and the vehicle 1 is placed at an angle. Therefore, the second generation unit 1442 may be configured to generate a path that does not move along the second circle S21 but linearly reverses and moves to the parking target position PT in the middle of the path of the second circle S21 at, for example, time at which the vehicle 1 is not placed at an angle.

Referring back to FIG. 9, when it is determined in step S35 that the intersection point P is located to the rear side of the parking target position PT (Yes in step S35), the space of the available parking area between the parked vehicle 300a ahead and the parked vehicle 300b behind is small as shown in FIG. 14, and the vehicle 1 may be placed at an angle at the parking target position PT.

Figure 15:
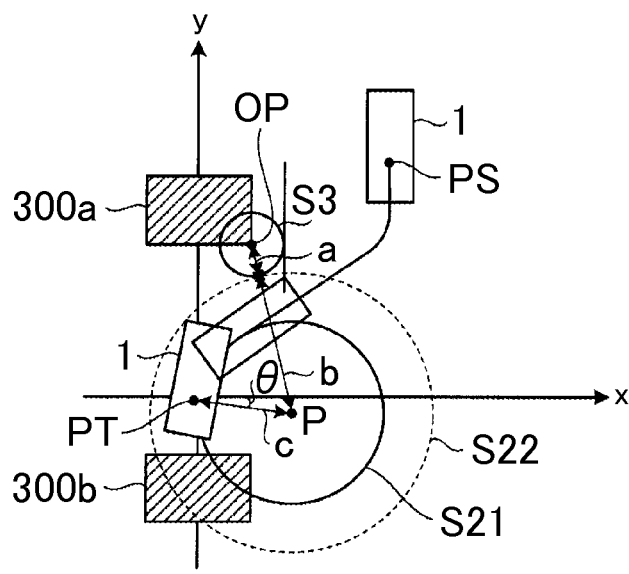
FIG. 15 is a view that shows an example of generating a second circle in path determination according to the embodiment.

Therefore, in this case, the second generation unit 1442 determines the intersection point P as the center position of the second circle, and generates (draws) the circle S21 that has a center at the intersection point P and that has the turning radius c of the midpoint between the rear wheels 3R of the vehicle 1 at the minimum turn as a second circle (step S36). FIG. 15 shows a state where the second circle is generated. In FIG. 15, a circle S22 that has a center at the intersection point P and that has the turning radius b of the distal end (front corner), opposite to the initial position PS side of the vehicle 1, at the minimum turn of the vehicle 1 is also indicated by the dotted line. In FIG. 15, a circle S3 of the avoidance margin a, having a center at the rear corner OP of the parked vehicle 300a ahead, is also shown.

The second generation unit 1442 determines the circular arc (first circumference) of the first circle S1 from the initial position PS and the circular arc (second circumference) of the second circle S21 from the contact point of the circular arc of the first circle S1 with the circular arc of the second circle S21 to the parking target position PT as a moving path (step S37).

At this time, as shown in FIG. 15, when an xy coordinate system having an origin at the parking target position PT is assumed, an angle θ that a straight line connecting the parking target position PT with the intersection point P makes with the x axis is equal to an angle θ at which the vehicle 1 is placed at the parking target position PT. Therefore, the moving path determination unit 144 just needs to determine on the basis of the angle θ whether the vehicle 1 is parked at an angle at the parking target position PT.

Referring back to FIG. 6, when the moving path RTP is determined, the ECU 14 proceeds to parking assist control (step S15).

Figure 16:
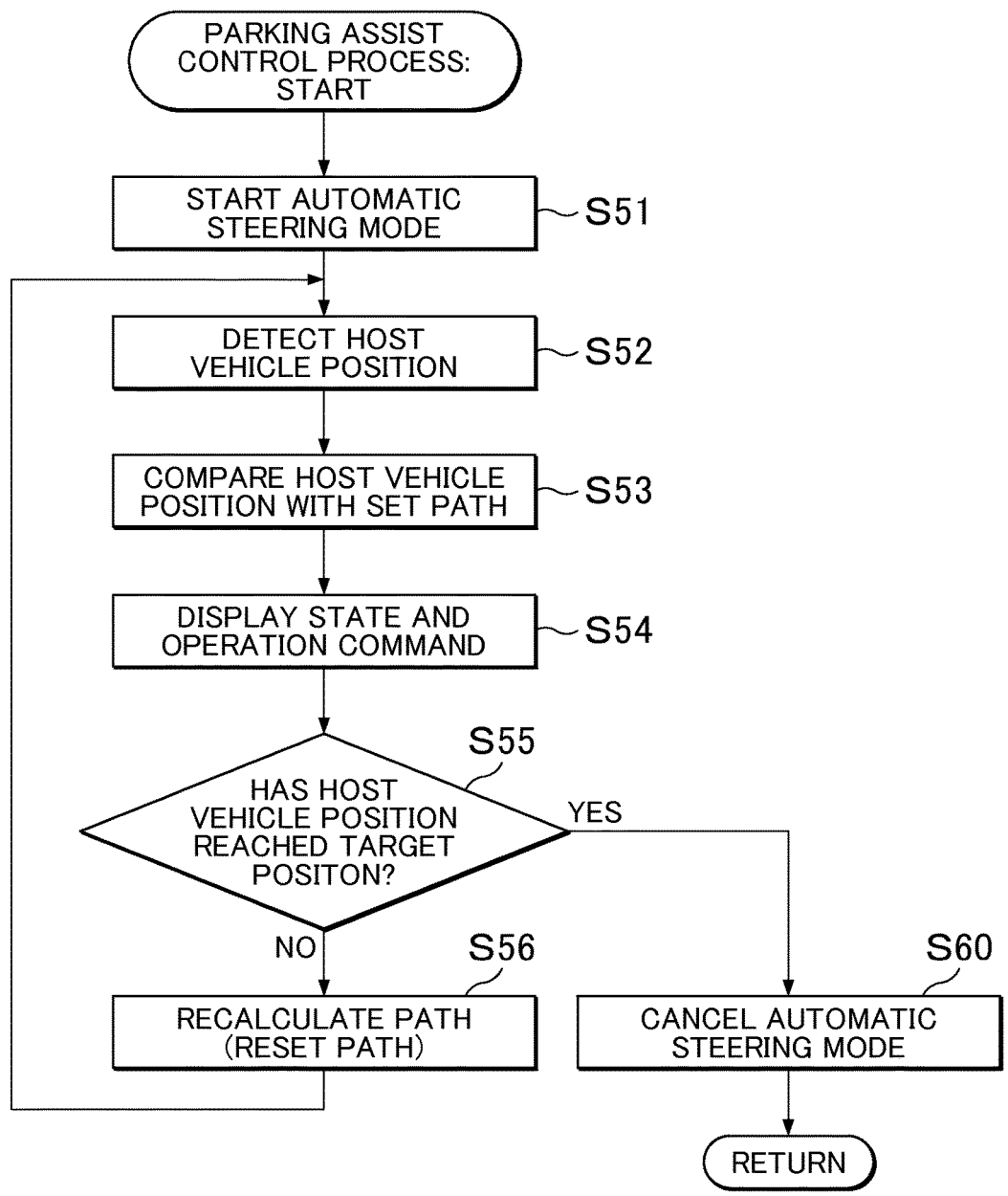
FIG. 16 is a flowchart that shows the procedure of a parking assist control process according to the embodiment.

FIG. 16 is a process flowchart of a parking assist control process. Initially, the ECU 14 functions as the moving control unit 145, starts the automatic steering mode for automatic steering in order to control the portions of the vehicle 1 such that the vehicle 1 moves to the parking target position PT that is the moving target position along the moving path (step S51).

In this automatic steering mode, the driver does not need to operate the steering unit 4, specifically, the steering wheel. Creeping in which the driving force of the engine is transmitted without depressing operation of the accelerator pedal, which is an operation of the accelerator operation unit 5, is utilized for the forward driving force and reverse driving force of the vehicle 1 during the parking assist control process.

Therefore, the driver just operates the brake pedal that serves as the brake operation unit 6 and the shift lever that serves as the shift operation unit 7 in accordance with display on the display device 12.

Subsequently, the moving control unit 145 detects a host vehicle position (step S52). Specifically, the moving control unit 145 (ECU 14) detects the host vehicle position by calculating a distance and a direction, which correspond to a moving amount from the initial position PS, on the basis of the steering amount of the steering unit 4, detected by the steering angle sensor 19, and the vehicle speed detected by the wheel speed sensor 22.

Thus, the ECU 14 compares the set path with the host vehicle position (step S53), functions as the output information determination unit 146 to determine information about the state of the vehicle and an operation command to the driver and display the information about the state of the vehicle and the operation command on the display device 12 (step S54).

Subsequently, the ECU 14 functions as the moving control unit 145, and determines whether the host vehicle position has reached the parking target position PT that serves as the target position (step S55).

When the host vehicle position has not reached the parking target position PT that serves as the target position yet (No in step S55), the ECU 14 functions as the moving path determination unit 144 again, recalculates a moving path, and resets a moving path (step S56). Specifically, the path determination process described with reference to FIG. 9 is executed. This is because the vehicle 1 does not always travel along a set moving path depending on a road surface condition, or the like, and, therefore, an optimal moving path is kept commensurately with an actual condition.

The ECU 14 proceeds to step S52 again, and repeats a similar process thereafter.

When it is determined in step S55 that the host vehicle position has reached the parking target position PT that serves as the target position (Yes in step S55), the moving control unit 145 cancels the automatic steering mode (step S60), and the ECU 14 displays the end of the parking assist process in a command display region (not shown) of the screen 12a of the display device 12 and ends the parking assist process.

In this way, in the present embodiment, the moving path determination unit 144 generates the circumference of the first circle S1 that passes through the initial position PS of the vehicle 1 and that touches the traveling direction of the vehicle 1 as a moving path, determines the center position P (intersection point P) on the basis of the position of the initial position PS-side rear corner OP of the parked vehicle 300a ahead, the turning radius of the vehicle 1 at the minimum turn and the parking target position PT, and generates the circumference of the second circle S21 that has a center at the center position P and that passes through the parking target position PT and touches both the traveling direction of the vehicle 1 at the parking target position PT and the circumference of the first circle S1 as a moving path continuous with the circumference of the first circle S1.

More specifically, the moving path determination unit 144 generates the first circle S1, determines whether the first circular arc A1 having a radius that is the sum of the avoidance margin a from the rear corner OP for avoiding a collision of the vehicle 1 with the rear corner OP and the turning radius b of the distal end (front corner) of the vehicle 1 at the minimum turn of the vehicle 1 intersects with the second circular arc A2 having a radius (second radius) that is the turning radius c of the midpoint between the rear wheels 3R of the vehicle 1 at the minimum turn of the vehicle 1. When the first circular arc A1 intersects with the second circular arc A2, the moving path determination unit 144 determines whether the intersection point P is located to the rear side of the parking target position PT. When the intersection point P is located to the rear side of the parking target position PT, the moving path determination unit 144 determines the intersection point P as the center position. The moving path determination unit 144 generates the circumference of the second circle S21 that has a center at the center position P and that has a radius that is the turning radius c (second radius) of the midpoint between the rear wheels 3R of the vehicle 1 at the minimum turn of the vehicle 1. The moving path determination unit 144 generates the circumference of the second circle S21 as a moving path continuous with the circumference of the first circle S1.

Therefore, in the present embodiment, when the space of the available parking area is small, even at the time when it is determined whether the vehicle 1 is allowed to be parked when placed at an angle at the parking target position PT and the angle of the vehicle 1 in the case where the vehicle 1 is allowed to be parked is calculated, when the second circle S21 is generated by obtaining the center position at the intersection point P, the angle θ of the vehicle 1 is acquired. Therefore, it is not required to generate a plurality of second circles having different radii little by little, and it is possible to reduce the amount of computation at the time of determining a path.

The embodiment of the invention is described above; however, the embodiment is only illustrative and not intended to limit the scope of the invention. This novel embodiment may be implemented in other various forms, and may be variously omitted, replaced or changed without departing from the spirit of the invention. The scope and spirit of the invention encompass the embodiment and its modifications, and the invention described in the appended claims and equivalents thereof encompass these embodiments and their modifications.

For example, the avoidance margin a is changeable on the basis of a driver's position and the height of the seat. That is, the driver may set the long or short avoidance margin a by specifying the avoidance margin a through the operation unit 14g, or the like, in response to the height of eyes based on the driver's position and the height of the seat. In this case, the driver is allowed to determine a desired path.

When it is determined that the vehicle 1 is placed at the angle θ at the parking target position PT, the moving path determination unit 144 may be configured to further generate a path in which the steering wheel is maneuvered by using forward and reverse gears, and the moving control unit 145 may be configured to maneuver the steering wheel by using forward and reverse gears. Thus, it is possible to perform further appropriate parking assist.

As described above, the moving path determination unit 144 may be configured to, after generating the moving path formed of the circumference (first circumference) of the first circle S1 and the circumference (second circumference) of the second circle S21, regenerate a path from the initial position PS of the vehicle 1 to the target position PT, including a clothoid curve, on the basis of the moving path, and determine the regenerated path as the moving path of the vehicle 1.

That is, at the time when the vehicle 1 moves along the path from the initial position PS along the first circumference and the path along the second circumference, dry steering for rotating the steering wheel during a stop of the vehicle 1 occurs at the initial position PS and the contact point of the first circumference with the second circumference. In order not to perform dry steering, the moving path determination unit 144 just needs to draw (regenerate) a moving path formed of a clothoid curve, a circular arc and a clothoid curve on the basis of the moving path formed of the first circumference and the second circumference, and the moving control unit 145 just needs to execute control such that the vehicle 1 is moved along the moving path. Thus, when the vehicle 1 moves along the regenerated moving path, it is not required to perform dry steering.

In the present embodiment, a moving path determination method for, at the time of assisting in parking the vehicle 1 to a parking area, determining a moving path from the initial position PS of the vehicle 1 to the parking target position PT includes: generating a circumference of the first circle S1 that passes through the initial position PS and that touches the traveling direction of the vehicle 1, as a moving path; determining the center position P on the basis of the position of the rear corner OP of the parked vehicle 300a ahead, the turning radius of the vehicle 1 at the minimum turn and the parking target position PT; and generating a circumference of the second circle S21 that has a center at the center position P and that passes through the parking target position PT and touches both the traveling direction of the vehicle 1 at the parking target position PT and the circumference of the first circle S1, as a moving path continuous with the circumference of the first circle S1. Thus, it is possible to reduce the amount of computation at the time of determining a moving path.

Figure 17:
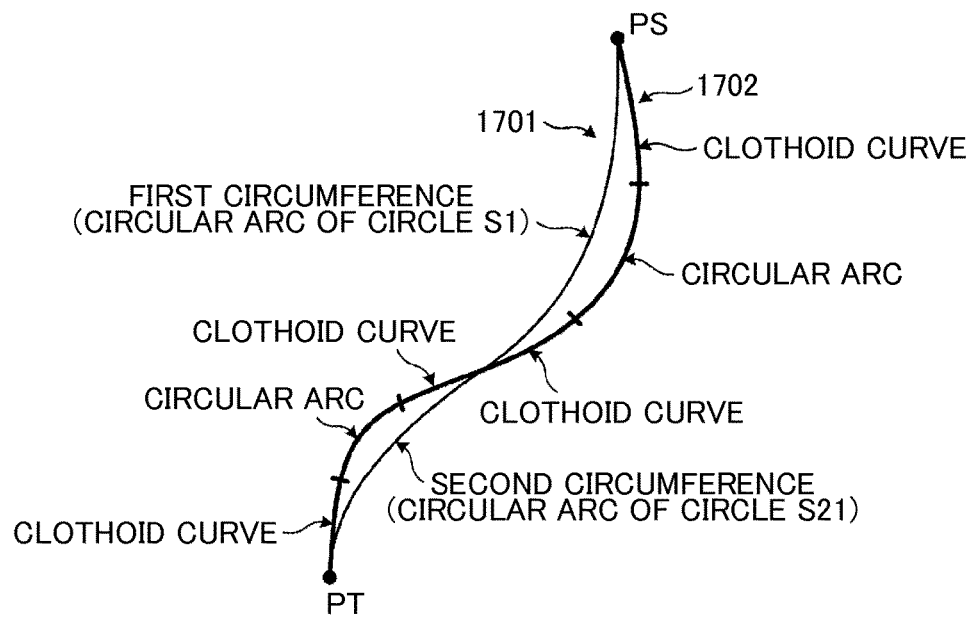
FIG. 17 is a view that shows an example of a moving path formed of a first circumference and a second circumference and a regenerated moving path according to an alternative embodiment to the embodiment.

FIG. 17 is a view that shows a moving path formed of a first circumference and a second circumference and a regenerated moving path in this alternative embodiment. FIG. 17 shows that the moving path determination unit 144 redraws a moving path 1702 formed of a clothoid curve, a circular arc and a clothoid curve on the basis of a moving path 1701 formed of a first circumference and a second circumference.

Figure 18:
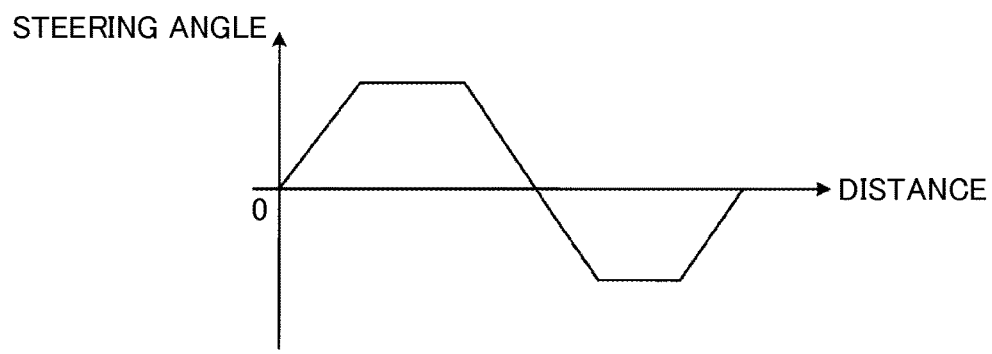
FIG. 18 is a view that shows an example of the relationship between a distance and a steering angle in the case where a vehicle moves along the regenerated moving path according to the alternative embodiment to the embodiment.

FIG. 18 is a view that shows the relationship between a distance and a steering angle in the case where the vehicle 1 moves along the regenerated moving path according to the alternative embodiment. In the redrawn moving path 1702 shown in FIG. 17, the clothoid curve path corresponds to a path along which the steering angle increases or reduces as shown in FIG. 18. In the redrawn moving path 1702 shown in FIG. 17, the circular arc path corresponds to a path along which the steering angle is constant as shown in FIG. 18.

When the vehicle 1 is caused to move to the target position PT along the second circumference by the moving control unit 145, the vehicle 1 reaches the target position PT in a state where the steering wheel is steered. When the steering angle of the steering wheel is intended to be set to zero at the target position PT, the moving path determination unit 144 just needs to be configured to redraw (regenerate) a path formed of a circular arc, a clothoid curve, a circular arc and a straight line or a path formed of a circular arc, a clothoid curve and a straight line on the basis of the second circumference. Alternatively, the moving control unit 145 may be configured to return the steering angle to zero at the target position PT by controlling the vehicle such that the vehicle 1 is moved, while the steering wheel is turned, to change the traveling direction of the vehicle between a forward direction and a reverse direction.

The initial position PS of the vehicle 1 indicates the start point of the first circumference, and does not exclude control over the vehicle 1 from the start of parking assist of the vehicle 1 to the initial position PS. For example, when there is a difference between an orientation at the target position PT and an orientation at the initial position PS of the vehicle 1, the moving path determination unit 144 and the moving control unit 145 may be configured to move the vehicle 1 to the initial position PS along such a moving path that adjusts the angle of the vehicle 1 before the vehicle 1 reaches the initial position PS and then move the vehicle 1 along the moving path based on the first circumference and the second circumference.

What is claimed is:

1. A parking assist system for a vehicle comprising:
rear wheels; and
an electronic control unit configured to:
at a time of assisting in parking the vehicle to a parking area, determine a path from an initial position of the vehicle to a target position;
generate a first circumference that passes through the initial position and that touches a traveling direction of the vehicle, as the path;
determine a center position on the basis of a position of a rear corner of a parked vehicle ahead, a turning radius of the vehicle at a minimum turn and the target position;
generate a second circumference that has a center at the center position and that passes through the target position and touches both the traveling direction of the vehicle at the target position and the first circumference, as the path continuous with the first circumference;
determine whether a first circular arc having a radius that is a sum of an avoidance distance from the rear corner for avoiding a collision with the rear corner and a first radius that is a turning radius of a front corner of the vehicle at the minimum turn of the vehicle intersects with a second circular arc having a radius that is a second radius that is a turning radius of a midpoint between the rear wheels of the vehicle at the minimum turn of the vehicle;
when the first circular arc intersects with the second circular arc, determine whether an intersection point of the first circular arc with the second circular arc is located to a rear side of the target position;
when the intersection point is located to the rear side of the target position, determine the intersection point as the center position; and
generate the second circumference that has a center at the center position and that has a radius that is the second radius.

2. The parking assist system according to claim 1, wherein the avoidance distance is changeable on the basis of a driver's position and a height of a seat.

3. The parking assist system according to claim 2, wherein the electronic control unit is configured to, when the vehicle is placed at an angle at the target position, control the vehicle such that the vehicle is moved, while a steering unit is turned, to change the traveling direction of the vehicle between a forward direction and a reverse direction.

4. The parking assist system according to claim 3, wherein the electronic control unit is configured to regenerate a path from the initial position to the target position, including a clothoid curve, on the basis of the path formed of the first circumference and the second circumference.

5. The parking assist system according to claim 2, wherein the electronic control unit is configured to regenerate a path from the initial position to the target position, including a clothoid curve, on the basis of the path formed of the first circumference and the second circumference.

6. The parking assist system according to claim 1, wherein the electronic control unit is configured to, when the vehicle is placed at an angle at the target position, control the vehicle such that the vehicle is moved, while a steering unit is turned, to change the traveling direction of the vehicle between a forward direction and a reverse direction.

7. The parking assist system according to claim 1, wherein the electronic control unit is configured to regenerate a path from the initial position to the target position, including a clothoid curve, on the basis of the path formed of the first circumference and the second circumference.

8. The parking assist system according to claim 1, wherein the electronic control unit is configured to, when the vehicle is placed at an angle at the target position, control the vehicle such that the vehicle is moved, while a steering unit is turned, to change the traveling direction of the vehicle between a forward direction and a reverse direction.

9. The parking assist system according to claim 1, wherein the electronic control unit is configured to regenerate a path from the initial position to the target position, including a clothoid curve, on the basis of the path formed of the first circumference and the second circumference.

10. A path determination method for, at a time of assisting in parking a vehicle to a parking area, determining a path from an initial position of the vehicle to a target position, comprising:
generating a first circumference that passes through the initial position and that touches a traveling direction of the vehicle, as the path;
determining a center position on the basis of a position of a rear corner of a parked vehicle ahead, a turning radius of the vehicle at a minimum turn and the target position; and
generating a second circumference that has a center at the center position and that passes through the target position and touches both the traveling direction of the vehicle at the target position and the first circumference, as the path continuous with the first circumference; wherein
it is determined whether a first circular arc having a radius that is a sum of an avoidance distance from the rear corner for avoiding a collision with the rear corner and a first radius that is a turning radius of a front corner of the vehicle at the minimum turn of the vehicle intersects with a second circular arc having a radius that is a second radius that is a turning radius of a midpoint between rear wheels of the vehicle at the minimum turn of the vehicle;
when the first circular arc intersects with the second circular arc, it is determined whether an intersection point of the first circular arc with the second circular arc is located to a rear side of the target position;

when the intersection point is located to the rear side of the target position, the intersection point as the center position is determined; and the second circumference that has a center at the center position and that has a radius that is the second radius is generated.

11. The path determination method according to claim 10, wherein the avoidance distance is changeable on the basis of a driver's position and a height of a seat.

12. The path determination method according to claim 11, wherein, when the vehicle is placed at an angle at the target position, the vehicle is controlled such that the vehicle is moved, while a steering unit is turned, to change the traveling direction of the vehicle between a forward direction and a reverse direction.

13. The parking assist method according to claim 12, wherein a path from the initial position to the target position, including a clothoid curve, is regenerated on the basis of the path formed of the first circumference and the second circumference.

14. The parking assist method according to claim 11, wherein a path from the initial position to the target position, including a clothoid curve, is regenerated on the basis of the path formed of the first circumference and the second circumference.

15. The parking assist method according to claim 10, wherein, when the vehicle is placed at an angle at the target position, the vehicle is controlled such that the vehicle is moved, while a steering unit is turned, to change the traveling direction of the vehicle between a forward direction and a reverse direction.

16. The parking assist method according to claim 10, wherein a path from the initial position to the target position, including a clothoid curve, is regenerated on the basis of the path formed of the first circumference and the second circumference.

17. The parking assist method according to claim 10, wherein, when the vehicle is placed at an angle at the target position, the vehicle is controlled such that the vehicle is moved, while a steering unit is turned, to change the traveling direction of the vehicle between a forward direction and a reverse direction.

18. The parking assist method according to claim 10, wherein a path from the initial position to the target position, including a clothoid curve, is regenerated on the basis of the path formed of the first circumference and the second circumference.

* * * * *